United States Patent [19]
Darsi et al.

[11] 3,898,291
[45] Aug. 5, 1975

[54] SEPARATION OF ETHANOL AND ISOPROPANOL BY SOLVENT EXTRACTION

[75] Inventors: Chandrasekhara Rao Darsi; Gerald Anthony Specken, both of Edmonton; Gerald Alexander Martin, Two Hills, all of Canada

[73] Assignee: Celanese Canada Limited, Montreal, Canada

[22] Filed: Oct. 2, 1972

[21] Appl. No.: 294,149

Related U.S. Application Data

[63] Continuation of Ser. No. 876,925, Nov. 14, 1969, abandoned.

[52] U.S. Cl................. 260/643 D; 23/310; 203/99; 210/511
[51] Int. Cl.............................................. C07c 29/24
[58] Field of Search................................. 260/643 D

[56] References Cited
UNITED STATES PATENTS

| | | | |
|---|---|---|---|
| 2,510,806 | 6/1950 | Egberts et al..................... | 260/643 D |
| 2,658,069 | 11/1953 | Waals.............................. | 260/643 D |
| 2,880,179 | 3/1959 | Comar.................................. | 260/705 |
| 2,985,689 | 5/1961 | Leeds............................... | 260/635 Y |
| 2,997,447 | 8/1961 | Russell et al..................... | 260/635 Y |
| 3,088,982 | 5/1963 | Feldman et al. ................. | 260/643 D |
| 3,326,953 | 6/1967 | Gautreaux ........................... | 260/705 |
| 3,394,195 | 6/1967 | Conley et al..................... | 260/643 D |
| 3,647,891 | 3/1972 | Loudas et al. ...................... | 260/633 |
| 3,692,847 | 9/1972 | Brentel et al. ..................... | 260/633 |

FOREIGN PATENTS OR APPLICATIONS

| 556,048 | 4/1958 | Canada........................... | 260/643 D |

OTHER PUBLICATIONS

Langen, "Handbook of Chemistry," 10th ed., (1961), pp. 804, 805.

Treybal, "Liquid Extraction," 2nd ed., (1963), pp. 308, 309, 310, 343, 344.

Alders, "Liquid Liquid Extraction," 2nd ed., (1959), pp. 136 to 148.

*Primary Examiner*—Joseph E. Evans

[57] ABSTRACT

A process to separate a mixture containing ethanol and isopropanol, into said ethanol and said isopropanol, the said process which comprises:

a. selecting two mutually insoluble solvents having different specific gravity, one of said solvents being an aqueous solution having an affinity greater for ethanol and the other an organic solvent having a greater affinity for isopropanol, and, b. passing through a zone containing a mixture of said ethanol and said isopropanol a downward current of the solvent having the higher specific gravity and an upward current of the solvent having the lower specific gravity, and collecting near the bottom and the top of said zone, respectively, said streams of solvents, and an apparatus for carrying the same. The solute dissolved in water is selected to produce a salt effect to further reduce the solubility of isopropanol in water.

Examples of mutually insoluble solvents which may be used include: branched chain liquid alcohols immiscible with water and having about 7 carbon atoms or more and an aqueous solution of sodium sulfate; unsaturated methyl fatty esters, the esters having from 16 to 18 carbon atoms in the acid groups and an aqueous solution of sodium formate; petroleum aliphatic solvents, (such as "Varsol", a trade mark), containing about 5 to 6% by weight of 2-ethylhexanol and an aqueous solution containing about 20% by weight of sodium chloride.

8 Claims, 5 Drawing Figures

SEPARATION OF ETHANOL AND ISOPROPANOL BY SOLVENT EXTRACTION

This is a continuation of application Ser. No. 876,925, filed Nov. 14, 1969 and now abandoned.

This invention relates to a process for the separation of mixtures containing ethanol and isopropanol, and to an apparatus especially adapted to carrying out said process at atmospheric pressure. The boiling points of ethanol (EtOH) 78.3°C and isopropanol (IPA) 82.3°C, are only 4.°C apart. Separation by distillation of mixtures consisting of components whose boiling points are so close to each other into pure constituent components is difficult. A large number of theoretical stages and high reflux ratios are required, which makes the equipment very large and the process expensive. Consequently, other methods are usually resorted to in these cases. The most commonly used methods are extractive and azeotropic distillations. To date, no effective solvent has been reported to carry out the separation of ethanol and isopropanol using extractive distillation. Azeotropic distillation, at least in theory, shows promise. However, the high reflux ratios required to effect such a separation generally makes the process uneconomical.

There has now been found a process to separate a mixture containing ethanol and isopropanol alcohols, the said process comprising:

a. selecting two mutually insoluble solvents having different specific gravity, one of said solvents being an aqueous solution having an affinity greater for ethanol and the other an organic solvent having greater affinity for isopropanol, and, b. passing through a zone containing a mixture of said ethanol and said isopropanol a downward current of the solvent having the higher specific gravity and an upward current of the solvent having the lower specific gravity, and collecting near the bottom and the top of said zone, respectively, said streams of solvents.

Thus the aqueous solution forms an aqueous phase which preferentially dissolves ethanol. The aqueous solution generally contains as solute an hydrophilic salt producing a salt effect to further reduce the solubility of isopropanol in water. One pair of mutually insoluble solvents consists of "Varsol", (a trade mark for a commercially petroleum solvent)containing about 5 to 6% weight of 2-ethylhexanol to preferentially dissolve isopropanol in an organic solvent and an aqueous solution of sodium chloride to preferentially dissolve the ethanol. The aqueous solution generally contains about 20% by weight sodium chloride.

A second pair of mutually insoluble solvents consists of unsaturated methyl fatty esters, the esters having from about 16 to 18 carbon atoms in the acid groups to dissolve isopropanol in an organic phase and an aqueous solution of sodium formate to dissolve the ethanol.

It is also preferable to select solvents which are relatively stable to heat in order to easily separate the ethanol and isopropanol from their respective phases after the extraction step. If the solvents are stable to heat, for instance, the separation may be done easily by distillation.

Other systems which show favorable distribution coefficients consist of a 5% to less than 15 wt % aqueous solution of sodium sulfate as the aqueous phase, and of branched chain liquid alcohols immiscible with water and having about 7 carbon atoms or more, as the organic phase.

Preferably, the system consists of isodecanol which is easily available (mixed isomers) in the industry, and an aqueous solution of sodium sulfate.

The amount of salt in the aqueous phase is critical as will be seen later and it is generally adjusted to optimize the extraction and serve as an agent repulsing isopropanol. The amount of solvent to be used must be determined experimentally. It depends upon the extraction temperature, the concentration of the alcohols and of the solvents and the rate of extraction. For practical purposes, the extraction process is generally conducted at room temperature.

Particular embodiments of the invention will now be discussed with reference to an aqueous solution of sodium sulfate and isodecanol. The following will now illustrate one of the bext ways of carrying out the inventive idea. But the invention is not limited thereto.

In drawings which illustrate embodiments of the invention:

Figure 3:
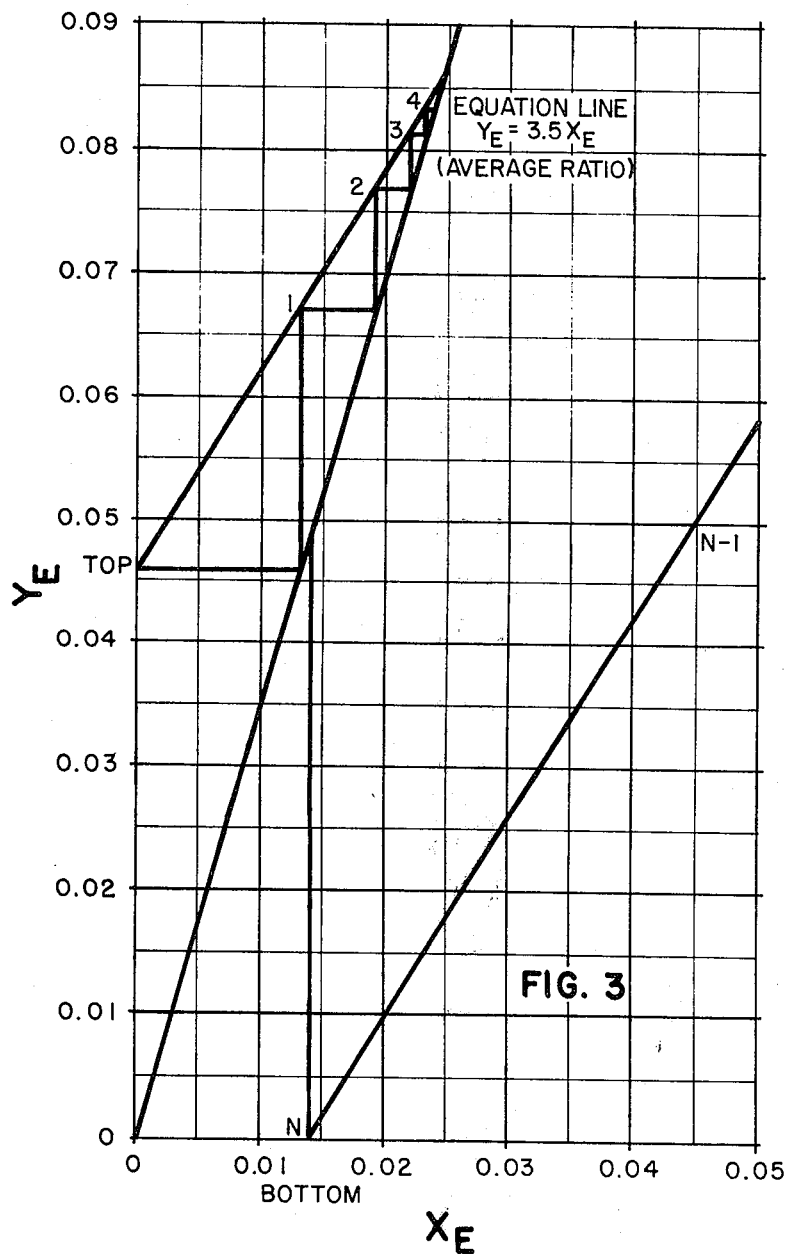

FIG. 3, which refers to Example I, is a graph showing state-to-stage construction for component E (isopropanol).

Figure 4:
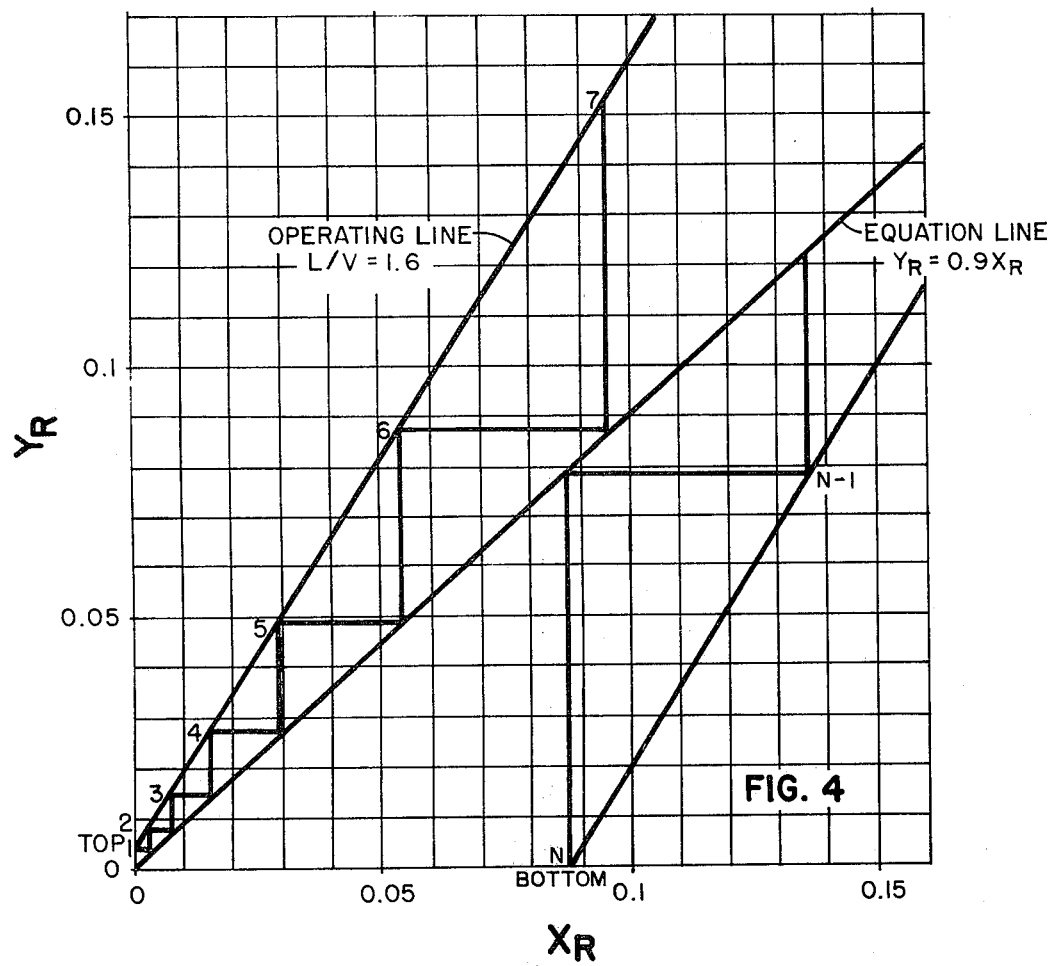

FIG. 4, which refers to Example I, is a graph showing stage-to-stage construction for component R (ethanol).

Figure 5:
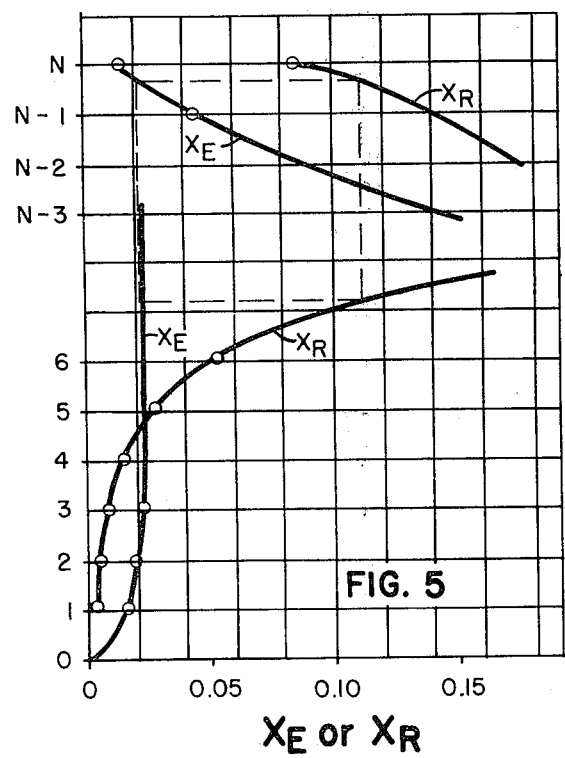

FIG. 5, which refers to Example I, is a graph which shows the number of stages and the feed stage location.

Figure 1:
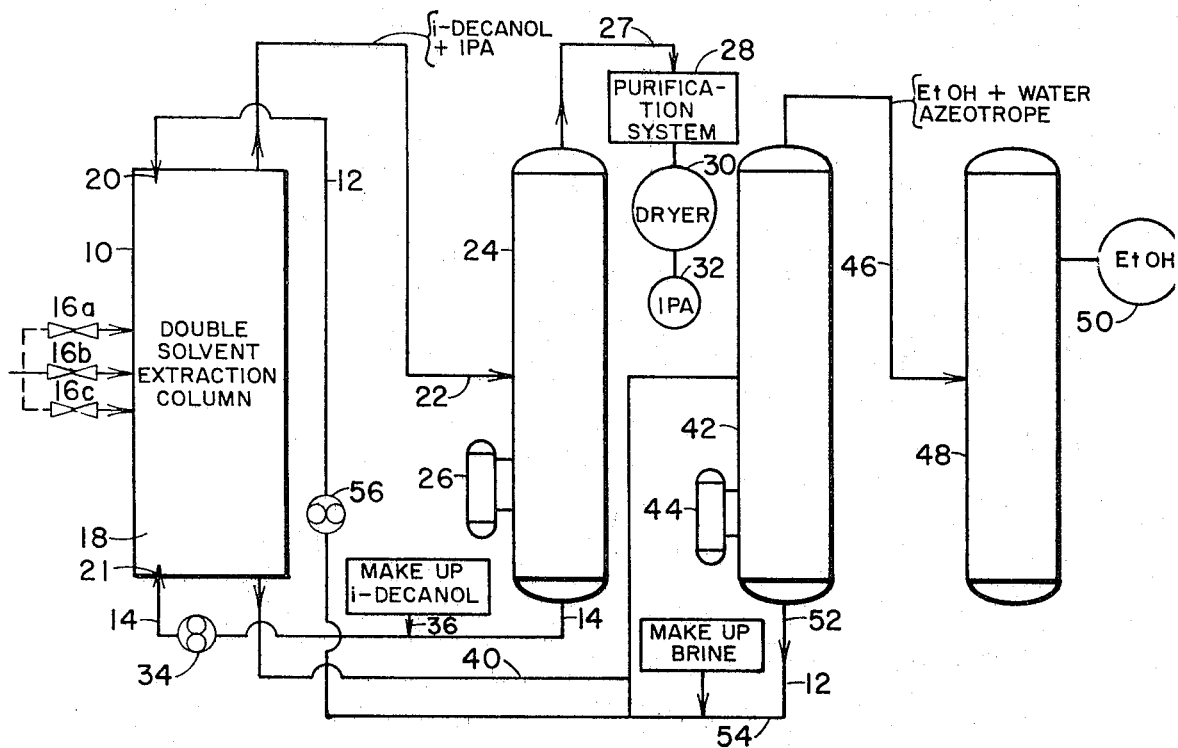
FIG. 1 is a schematic view showing the arrangement of a double solvent extraction column and other components used for the separation of a liquid mixture containing ethanol and isopropanol.

Referring now to FIG. 1, number 10 designates a double solvent extraction column (which is rust resistant) having at the top, line 12 to feed into the extraction column one of the two mutually insoluble solvents. The solvent fed via line 12 must be the one which has the higher specific gravity: generally the aqueous phase, for instance, an aqueous sodium sulfate solution.

The other solvent having the lowest specific gravity which is fed at the bottom of the extraction column via line 14, is generally the solvent forming the organic phase, for instance, isodecanol.

The dimension of the double solvent extraction column depends upon the height equivalent to a theoretical stage value (H.E.T.S.) of the column and the number of theoretical stages necessary to affect the predetermined degree of separation of the ethanol-isopropanol mixture. The ethanol (EtOH) and isopropanol (IPA) mixture to be separated, is fed into the extraction column via at least one of the lines 16a, 16b, and 16c provided with valves. The lines 16a, 16b and 16c are located at distances from the top and bottom of the extraction column 10 such that the number of theoretical stages below the feed lines 16 and the number of theoretical stages above the feed lines 16 are sufficient to obtain the degree of separation required respectively for isopropanol and ethanol, as is discussed in Table III herein below.

In order to provide greater surface area between the two immiscible liquids (i.e., the finest degree of subdivision of one phase into the other) and therefore better extraction, the extraction column is generally packed.

Substances which may be used to pack the column includes glass beads 18, "Goodloe" stainless steel packing and other meshed stainless steel wires, provided that the material used does not easily corrode, in the presence of the solvents. On either end of the extraction column 10, interface separators 20 and 21 generally are provided.

When an organic phase having a low specific gravity (such as isodecanol) is delivered via line 14, it preferentially dissolves isopropanol as it rises to the top of the extraction column 10. Once at the top, the organic phase passes along the line 22 which generally leads to a fractionating column 24 or stripper for the separation of isopropanol from the solvent forming said organic phase, providing said solvent is able to be submitted to a high temperature. The fractionating column 24 is provided with a thermosyphon reboiler 26 suitably heated, and other necessary auxiliaries. In the fractionating column 24 the isopropanol is separated and collected at or near the top via line 27.

The isopropanol may then be dried by distillation in the presence of benzene at 30, and then collected or stored at 32. In the fractionating column 24 the remaining portion of the organic phase such as isodecanol, which has a higher boiling point, is recycled via 14 by means of pump 34. From line 36, further solvent forming the organic phase, such as isodecanol, is delivered into line 14 to make up for losses incurred during the cyclic operation.

Simultaneously, the other solution forming the aqueous phase, such as a solution of sodium sulfate, is fed into the extraction column 10 via line 12, and moves down the column 10 while preferentially dissolving ethanol, and escapes via 40 into a fractionating column or stripper 42. The fractionating column 42 is equipped with a thermosyphon reboiler 44, the azeotrope-water-ethanol is collected at the top 46 to be dryed with a system such as benzene at 48, to then be collected at 50. The aqueous solution such as sodium sulfate solution, leaves the fractionating column 42 at 52 and is partly replenished at 54 and then pumped at 56 via 12 to be recycled.

The apparatus shown in FIG. 1 may be modified in several ways. For instance, instead of using a single extraction column, two or more extractors may be used in series. Instead of a very large extraction column, a plurality of shorter ones may be used, as shown in the next Figure.

Figure 2:
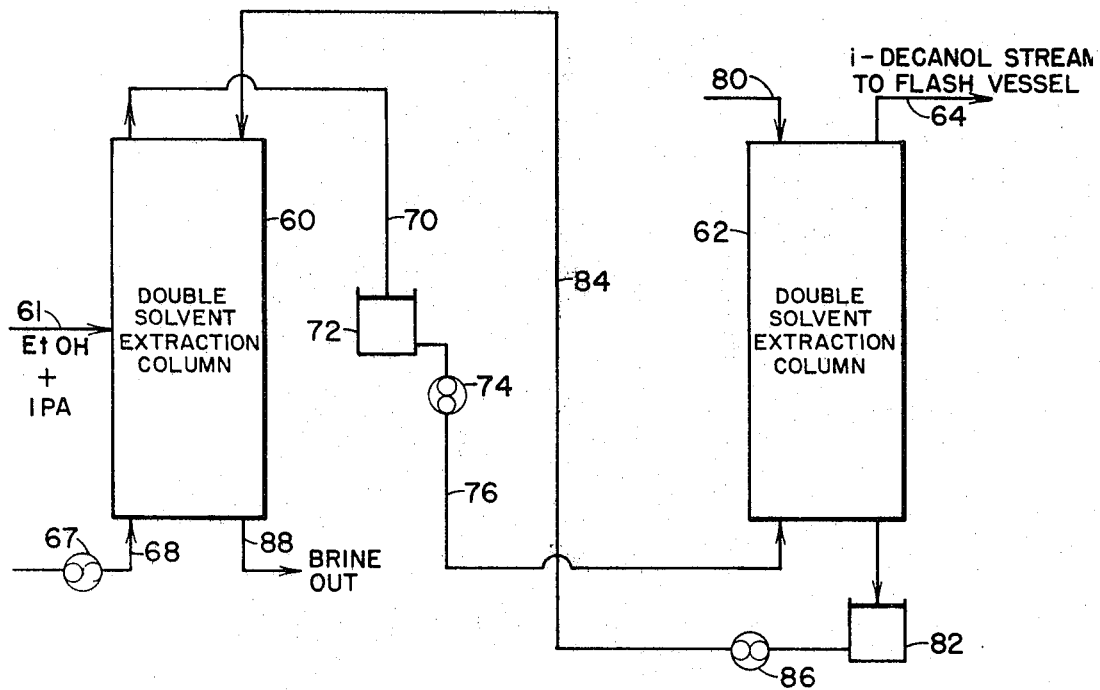
FIG. 2 is a schematic view of a pair of double extraction columns emphasizing the interrelation between said two columns.

Referring now to FIG. 2, numbers 60 and 62 designate respectively, two extraction columns. The isopropanol-ethanol mixture to be separated is pumped via 61 at about mid-height into column 60. Similarly, the hydrophobic solvent, having the lowest specific gravity such as isodecanol, is pumped to the bottom of the column 60 via 68 by pump 67. The hydrophobic solvent, such as isodecanol forming the organic phase, preferentially dissolves isopropanol as it rises to the top of the tower. At the top, the organic phase passes along line 70 into an auxiliary reservoir 72, and then 72 is pumped at 74 and is forced via 76 into the tower 62. In the presence of the aqueous phase, the organic phase rises again partly by gravity and partly by pump 74, up to the top of said tower 62. At the top of the tower 62, the organic phase escapes via line 64 where it may be then further treated, as we have already discussed. For instance, line 64 may be connected to a fractionating column, as shown in FIG. 1, number 24. The aqueous phase such as sodium sulfate solution, is fed into the uppermost portion of the extraction column 62 via line 80 to the bottom of the extraction column into an auxiliary reservoir 82 and then pumped via line 84 to the top of column 60 by pump 86 and down the column to the outlet 88 for the extraction of ethanol and the salting out therefrom of isopropanol.

The extraction process should be carried out so as to prevent homogeneous phase formation. For that reason, the stream rate $L'$ of the aqueous phase, the stream rate $V'$ of the organic phase, and the stream rate $F'$ of the feed mixture (ethanol-isopropanol) are generally adjusted such that $$\frac{L' + V'}{F'} \geq 5$$

by weight and preferably the ratio $$\frac{L' + V'}{F'}$$

is from 5 to 7.

The ratio of $L'$ to $V'$ must also be selected such that the operating line ($L'/V'$) has a slope smaller than the equilibrium line, ($Y_E/X_E$).

where $X_E = \dfrac{\text{weight of isopropanol}}{\text{weight of (water} + Na_2SO_4)}$ at equilibrium and, $Y_E = \dfrac{\text{weight of isopropanol}}{\text{weight of i-decanol}}$ at equilibrium it has been found that generally $L'/V'$ should be greater than 1.6 and preferably 2, so as to avoid a "pinch" zone.

The concentration of sodium sulfate salt to be used in extraction process depends upon the composition of the mixture of ethanol and isopropanol. In general, any mixture of ethanol and isopropanol can be separated using the solvent pair isodecanol solutions of sodium sulfate. The amount of salt to be added to the aqueous solvent is proportioned to the ratio (weight percent isopropanol to weight percent ethanol) in the feed mixture.

Particular embodiments of the invention will now be more clearly understood by references to the following Examples. These specific examples are illustrative only and are not intended to limit the scope of the invention.

EXAMPLE 1

A mixture of ethanol-isopropanol, as shown in Table I, was fed into a double extraction column at 61 at the rate of *1.45 × 10³ parts per hour, while feeding simultaneously (via 68), 5.1 × 10³ parts per hour of i-decanol (mixed isomers), supplied by Union Carbide, New York (specific gravity of 0.8376), and 8.2 × 10³ parts of a 5% by weight aqueous solution of $Na_2SO_4$ (specific gravity = 1.0443) via 80.

*The parts indicated are parts by weight.

TABLE I

| | Analysis (% by Weight) of the mixture to be separated |
|---|---|
| Water | 12.0 |
| Ethanol | 55.95 |
| Isopropanol | 26.95 |
| Others | 5.10 |
| Specific Gravity: | 0.8240 |

The extraction columns were provided with Goodloe stainless packing. The extraction column 60 and 62 had, respectively, void fractions of 0.871 and 0.898. Their ratio of height to cross-sectional area were, respectively, 640:1 and 1010:1 allowing a residence time of a few hours. After 12 hours of extraction operation, the aqueous phase was $109.6 \times 10^3$ parts and the organic phase $65.9 \times 10^3$.

The product streams were analyzed and the results are shown in Table II. The results are based on weight %.

TABLE II

| | Organic Phase | Aqueous Phase |
|---|---|---|
| Ethanol | 0.14 | 7.90 |
| Isopropanol | 4.20 | 1.30 |
| Water | 3.0 | 85.80 |
| i-decanol | 92.00 | 0.00 |
| Others | 0.66 | 0.00 |
| $Na_2SO_4$ | 0.00 | 5.00 |

As can be easily seen, the organic phase contained 30 parts by weight of isopropanol per part of ethanol and the aqueous phase contained 6 parts by weight of ethanol per part of isopropanol. The alcohol feed contained 2.07 parts ethanol per part of isopropanol.

All of the minor and traces components showed greater affinity for i-decanol while the brine stream was essentially free of all these components.

Stage-to-stage calculation for the run described in Example I was made. For the theory, please refer to Treybal, R. E.., "Liquid Extraction", McGraw-Hill (1951), especially pp. 214–239. The summary is shown in Table III.

TABLE III

Nomenclature
Aqueous phase (5% $Na_2SO_4$ solution) - Raffinate, composition denoted by X, stream rates denoted by L' (solute-free basis).
Organic phase (i-decanol) - extract, composition denoted by Y, stream rates denoted by V' (solute-free basis).
Subscripts - IPA denoted by E, ethanol denoted by R.

$$X,Y = \frac{\text{wt. of components}}{\text{wt of solvent}}$$

Assumptions
1) Solvents are completely immiscible.
2) L'/l" ratio does not alter much due to the water coming in with feed stream.
3) Distribution coefficients, defined by $m=Y/X$ are constant
$V' = 5.1 \times 10^3$ parts per hour
$L' = 8.2 \times 10^3$ parts per hour
$F = 1.4 \times 10^3$ parts per hour
$(X_E)$ out = wt. of IPA
wt. of (water + $Na_2SO_4$)in base of A = 0.0143
Similarly, $(Y_E)$ out = 0.0456
$(X_r)$ out = 0.0870
$(Y_R)$ out = 0.00152

$$\text{Slope of the operating line} = \frac{L'}{V'} = \frac{8,200}{5,100} = 1.61$$

Distribution Coefficients (2) - Average value:
$m_E = 3.5$
$m_R = 0.9$

Following the procedure given by Treybal, stage-to-stage calculations for components E and R are made graphically (FIGS. 3 and 4) and the compositions are matched in FIG. 5 to give the number of stages and the feed stage location (shown in FIG. 1 as 16).
From FIGS. 3 and 4, the results are:

| | |
|---|---|
| No. of stages above feed | = 7.25 |
| No. of stages below feed | = 0.3 |
| Total number of Theoretical Stages | = 7.55 |

From the above, it can be easily seen that calculations may then be made for a given set of conditions to determine values, such as the number of theoretical stages required below and above a mixture fed into a given extraction column.

EXAMPLES 2 TO 7

The following examples were carried out in an apparatus similar to that shown in FIG. 2, except that only one extraction column was employed. This column consisted of a 2-inch diameter glass pipe filled with Goodloe stainless steel packing cartridges to provide a contact zone that was 149 inches in height. The column was pulsed by an air-actuated mechanical pulser acting inside and near the bottom of the column. The organic solvent fed upwardly into the extraction column was methyl fatty ester generally having 16 to 18 carbon atoms in the acid group, while the aqueous solvent fed downwardly was a sodium formate solution at concentrations indicated in the table herein below. The mixed ethanol-isopropanol feed was introduced into the base of the column, except for Example 2 where it entered at the middle of the column. Flow rates, concentrations, etc., were measured and are tabulated in Table IV. As can be easily seen, ethanol is more preferential to the aqueous phase than isopropanol, and conversely, isopropanol is more preferential to the organic phase than ethanol. Furthermore, the separation is obtained using relatively low solvent-to-feed ratios, which is a distinct advantage to the economics of such a separation.

TABLE IV

| Example No. | 2 | 3 | 4 | 5 | 6 | 7 |
|---|---|---|---|---|---|---|
| Rate of mixed ethanol-isopropanol fed (in parts by wt. per minute) | 26.9 | 48.4 | 42.0 | 50.7 | 40.0 | 41.0 |
| wt.% ethanol therein | 36.4 | 31.9 | 36.2 | 29.2 | 26.5 | 26.5 |
| wt.% isopropanol therein | 62.2 | 59.5 | 50.6 | 62.7 | 65.9 | 65.9 |

TABLE IV -Continued

| Example No. | 2 | 3 | 4 | 5 | 6 | 7 |
|---|---|---|---|---|---|---|
| Rate of methyl esters fed (in parts by weight per minute) | 53.8 | 123.1 | 124.3 | 126.7 | 126.0 | 124.6 |
| Rate of aqueous solution fed (in parts by weight per minute) | 94.8 | 179.4 | 176.4 | 176.6 | 167.5 | 158.6 |
| % sodium formate therein | 35.0 | 30.0 | 28.0 | 27.0 | 25.0 | 25.0 |
| Pulse frequency (in pulses per minute) | 96 | 98 | 96 | 96 | 96 | 92 |
| Rate of fluid leaving the top of the extractor (in parts by weight per minute) | 82.6 | 147.1 | 140.6 | 144.5 | 137.2 | 139.7 |
| wt.% ethanol therein | 0.92 | 0.49 | 0.16 | 0.30 | 0.09 | 0.15 |
| wt.% isopropanol therein | 22.2 | 12.8 | 7.72 | 9.96 | 7.73 | 8.23 |
| % ethanol components of the alcohol feed extracted by methyl esters | 77 | 5 | 2 | 3 | 1 | 2 |
| % isopropanol component of the alcohol feed extracted by the methyl esters | 99 | 59 | 49 | 48 | 37 | 43 |
| Rate of fluid leaving the bottom of the extractor (in parts by weight per minute) | 92.6 | 210.4 | 208.1 | 215.5 | 199.0 | 188.1 |
| wt.% ethanol therein | 3.6 | 8.49 | 7.05 | 8.90 | 7.70 | 7.20 |
| wt.% isopropanol therein | 0.3 | 8.30 | 5.42 | 9.50 | 10.8 | 10.3 |
| % ethanol component of the alcohol feed extracted by the sodium formate solution | 23 | 95 | 98 | 97 | 99 | 98 |
| % isopropanol component of the alcohol feed extracted by the sodium formate solution | 1 | 41 | 51 | 52 | 63 | 57 |

EXAMPLE 8

This example was carried out in an apparatus similar to that shown in FIG. 1. The extraction column internals consisted of teflon rotors mounted every two inches on a vertical shaft located axially in the 2-inch diameter glass column. The organic solvent fed upwardly into the extraction column was Varsol, (a trade mark for a commercial petroleum solvent), containing from 5 – 6% by weight of 2-ethylhexanol. This petroleum solvent was chosen for its hydrophobic property, and the 2ethylhexanol was added to it to enhance the isopropanol solubility in the organic phase. The aqueous solvent fed downwardly was a sodium chloride solution of 20 wt. % concentration. The mixed ethanol-isopropanol feed, containing about 50% of each alcohol species, was introduced near the middle of the extraction column, which was operated at room temperature.

Using an aqueous solvent-to-alcohol feed ratio of 3 to 1, and an organic solvent-to-alcohol feed catio of 2 to 1, the 50–50% ethanol-isopropanol mix was separated into two streams. An ethanol-rich stream, containing 67.1% ethanol and 30.6% isopropanol, was obtained after distillation from the aqueous sodium chloride solution. An isopropanol-rich stream, containing 59.6% isopropanol and 35.5% ethanol, was obtained after distillation from the organic solvent.

The embodiments of the invention in which an exclusive property or privilege is claimed are defined as follows:

1. A process for separating a liquid mixture of ethanol and isopropanol, which process comprises:
    continuously introducing said mixture into a solvent-extraction zone;
    continuously passing upwardly through said extraction zone an organic solvent which is a liquid, branched-chain, water-immiscible alcohol having at least about 7 carbon atoms;
    continuously passing downwardly through said extraction zone an aqueous solvent which is a 5% to less than 15% by weight solution of sodium sulfate in water; and
    drawing off near the top and bottom of said extraction zone respectively (a) an organic phase enriched with isopropanol and (b) an aqueous phase denoted L',
    the flow rate of the organic solvent denoted V' being adjusted such that the ratio L'/V' is less than $Y_E/X_E$, $Y_E$ being the concentration of isopropanol in said organic phase at equilibrium and $X_E$ being the concentration of isopropanol in the aqueous phase at equilibrium.

2. The process of claim 1 wherein the organic solvent is isodecanol.

3. The process according to claim 2 wherein the aqueous solution contains 5% by weight of water, of $Na_2SO_4$ and L'/V' < 3.5.

4. The process according to claim 2 wherein L'/V' is about 2.

5. The process according to claim 2 wherein the stream rate of the freshly fed mixture designated as F' is adjusted so that $$\frac{L' + V''}{F'} \geq 5.$$

6. The process according to claim 1 wherein the drawn-off organic phase is further fractionated by distillation and the isopropanol, collected therefrom.

7. The process according to claim 2 wherein the process is conducted at room temperature.

8. The process according to claim 2 wherein the extraction zone contains a packing material.

* * * * *

UNITED STATES PATENT OFFICE
CERTIFICATE OF CORRECTION

PATENT NO. : 3,898,291
DATED : August 5, 1975
INVENTOR(S) : C. R. Darsi; G. A. Specken; G. A. Martin It is certified that error appears in the above-identified patent and that said Letters Patent are hereby corrected as shown below:

In column 6, line 9, for "$(X_r)$ out" read -- $(X_R)$ out --.

In column 7, line 48, for "catio" read -- ratio --.

Signed and Sealed this twentieth Day of January 1976

[SEAL]

Attest:

RUTH C. MASON
*Attesting Officer*

C. MARSHALL DANN
*Commissioner of Patents and Trademarks*